June 18, 1929.  S. W. WILDING  1,718,019
LAMINATED MATERIAL FOR USE IN ARTIFICIAL DENTURES
Filed June 12, 1926
TRANSLUCENT GUM FACING
BACKING
INVENTOR
Sidney William Wilding,
By Byrnes, Stebbins & Parmelee,
His attorneys.

Patented June 18, 1929.

1,718,019

UNITED STATES PATENT OFFICE.

SIDNEY WILLIAM WILDING, OF LONDON, ENGLAND, ASSIGNOR TO THE AMALGAMATED DENTAL COMPANY LIMITED, OF LONDON, ENGLAND, A BRITISH COMPANY.

LAMINATED MATERIAL FOR USE IN ARTIFICIAL DENTURES.

Application filed June 12, 1926, Serial No. 115,681, and in Great Britain June 27, 1925.

This invention consists in improvements in or relating to the manufacture of artificial teeth and has particular reference to the preparation of gum facings.

Gum facings are generally at present made in one of three ways. Either they are formed from pink rubber composition which is opaque and in no way translucent; or they are formed of fused mineral matter producing a porcelain; or they are formed from what is sometimes termed synthetic enamel such, for example, as the condensation product of phenol and formaldehyde.

It is found that particularly when using the last mentioned material the gum facings are translucent and constitute a very much greater resemblance to the human gum than is obtained with the more generally used rubber composition. The translucent gum facings, however, possess the disadvantage that their colour tone frequently becomes degraded when a black or dark base material is employed for the denture. An object of the present invention is to prevent this drawback and accordingly the invention comprises, in or for the manufacture of an artificial denture, a gum facing formed of translucent material combined with a backing, other than the base material of the denture, for controlling the colour tone of the gum facing when it is in position. The invention is not limited to any particular composition of gum facing as it applies equally well to all such facings which are of a translucent nature.

The single figure of the accompanying drawing illustrates the present preferred form of the invention.

The coating may be applied either to the gum facing before the latter is affixed to the denture or it may be applied to the denture itself prior to the affixing of the gum facing.

The backing is itself preferably of an opaque nature and is generally of a light shade, for example white, cream, or pink. In the case in which the gum facing is formed of a material such as is exemplified by the condensation product above referred to, the backing may be formed of the same material with which a pigment is admixed to give it the required degree of opacity and the desired colour.

The backing may be in a liquid form to be painted on to the back of the gum facing or on to the base material of the denture. The liquid is preferably a solution, in a suitable solvent, of the same material as the enamel itself, with the addition of a pigment in such quantity that the resultant coating, after evaporation of the solvent, is sufficiently opaque to hide the colour of the base material of the denture. The gum facing may itself be manufactured as a composition strip comprising the material from which the gum facing is to be made and a backing of the nature above described.

In a preferred manner of carrying the invention into effect, which is now to be described as an example only, the gum facing is prepared by heating a solution of formaldehyde with phenol in the presence of caustic soda as a catalyst. Equal parts by weight of formaldehyde solution (40% strength) and phenol, together with 0.2% or less of caustic soda are boiled at atmospheric pressure and the condensation product which results will be the material from which the gum facing is formed. The same material may be used for the backing but in order to make it useful as such, a pigment, for example zinc oxide or barium sulphate or tin oxide or other non-toxic pigmentary material is added to give the backing the required degree of opacity and the required colour.

It will be understood that the invention is not limited to a backing which is formed in the main of the same material as that of the gum facing. Moreover, the backing itself may be formed as a strip of material which is to be applied, in company with the gum facing, to the denture.

The invention also includes, as an article of manufacture, a backing for the purpose above described, which backing has a degree of opacity such as to impart the desired colour tone to the facing and is a material which will adhere firmly both to the gum facing and to the base material of the denture and will set hard during a step in the manufacture of the finished denture.

I claim:—

1. For use in the manufacture of an artificial denture a composite material to represent gum portions of the denture and comprising a layer of translucent material constituting a gum facing and a backing layer of a condensation product of phenol and an aldehyde which undergoes induration by heat.

2. For use in the manufacture of an artificial denture a composite material to represent gum portions of the denture and comprising a layer of translucent material constituting a gum facing and a backing layer of a condensation product of phenol and an aldehyde which undergoes induration by heat, admixed with a pigment to give to the backing the required color and opacity in order to impart a natural appearance to the gum facing.

3. For use in the manufacture of an artificial denture a composite material to represent gum portions of the denture and comprising a layer of translucent material constituting a gum facing which has applied to it a solution of a condensation product of phenol and an aldehyde admixed with a pigment, in order to impart a natural appearance to the gum facing.

4. A method of forming a composite material to represent gum portions of artificial dentures, said method comprising coating one side of strip translucent material with a solution of a condensation product of phenol and an aldehyde admixed with a pigment.

5. A composite strip for use in the manufacture of an artificial denture, said composite strip comprising a gum facing of translucent material one surface of which is coated with a colour controlling material for controlling the colour appearance of the gum facing when applied to a denture.

6. A backing for use in the manufacture of artificial dentures and to be disposed between a translucent gum facing and the base material of the denture, said backing comprising a liquid paint as is exemplified by a solution of a condensation product of a phenol and an aldehyde.

7. A backing for use in the manufacture of artificial dentures and to be disposed between a translucent gum facing and the base material of the denture, said backing comprising a liquid paint which will adhere strongly to said gum facing and said base material and which will set hard under heat treatment.

8. A backing for use in the manufacture of an artificial denture and to be disposed between a translucent gum facing and the base material of the denture to impart the required colour tone to the gum facing, said backing comprising a condensation product of a phenol and an aldehyde in solution and admixed with a pigment.

9. In an artificial denture the combination of a gum facing of translucent material and a backing layer of a condensation product of a phenol and an aldehyde between said gum facing and the base material of the denture.

10. In an artificial denture the combination of a gum facing of translucent material and a backing layer of a material comprising a condensation product of a phenol and an aldehyde with the addition of a pigment, said backing layer being disposed between the said gum facing and the base material of the denture.

11. For use in the manufacture of an artificial denture, the combination of translucent material to constitute a gum facing and a liquid condensation product of a phenol and an aldehyde which will undergo induration by heat, which liquid condensation product is to be interposed between the gum facing and the base material of the denture and will serve to prevent the colour of the base material from affecting the colour tone of the gum facing.

12. For use in the manufacture of an artificial denture, the combination of translucent material to constitute a gum facing and a liquid paint comprising a condensation product of a phenol and an aldehyde in solution and admixed with a pigment, which liquid paint is to be interposed between the gum facing and the base material of the denture and will serve to prevent the colour of the base material from affecting the colour tone of the gum facing.

In testimony whereof I affix my signature.

SIDNEY WILLIAM WILDING.